United States Patent [19]
Bellocchio

[11] 3,803,517
[45] Apr. 9, 1974

[54] OSCILLATOR CONTROL POWER CONVERTER

[75] Inventor: Loren F. Bellocchio, Manhattan Beach, Calif.

[73] Assignee: North Ammerican Rockwell Corporation, El Segundo, Calif.

[22] Filed: Feb. 16, 1972

[21] Appl. No.: 226,882

[52] U.S. Cl.................. 331/113 R, 321/2, 321/18, 331/109
[51] Int. Cl. .......................................... H03k 3/282
[58] Field of Search .......... 331/113, 112; 321/2, 18, 321/15, 16

[56] References Cited
UNITED STATES PATENTS

| | | | |
|---|---|---|---|
| 3,037,172 | 5/1962 | Biard | 331/113 |
| 3,697,854 | 10/1972 | Berger | 321/18 |
| 3,706,023 | 12/1972 | Yamada | 321/2 |
| 3,117,270 | 1/1964 | Tailleur | 321/18 |
| 3,134,940 | 5/1964 | Massey et al. | 331/112 |
| 3,197,691 | 7/1965 | Gilbert | 321/8 |
| 3,373,334 | 3/1968 | Geisz et al. | 321/18 |
| 3,526,823 | 9/1970 | Genuit | 321/18 |
| 3,573,596 | 4/1971 | Kamil | 321/18 |

Primary Examiner—John Kominski
Attorney, Agent, or Firm—G. Donald Weber, Jr.; H. Fredrick Hamann; L. Lee Humphries

[57] ABSTRACT

An R-C oscillator controls a transistor switch between a D.C. input voltage and an inductive coil. Energy is stored in the coil during the switch ON time and is transferred through a diode to an putput capacitor during the switch OFF time. The D.C. output voltage, across the capacitor, is used as a feedback voltage to control the frequency of the oscillator. The frequency is increased or decreased as a function of a change in the input voltage or output, and the switch is switched ON as a function of the oscillator frequency to maintain a constant output voltage.

6 Claims, 4 Drawing Figures

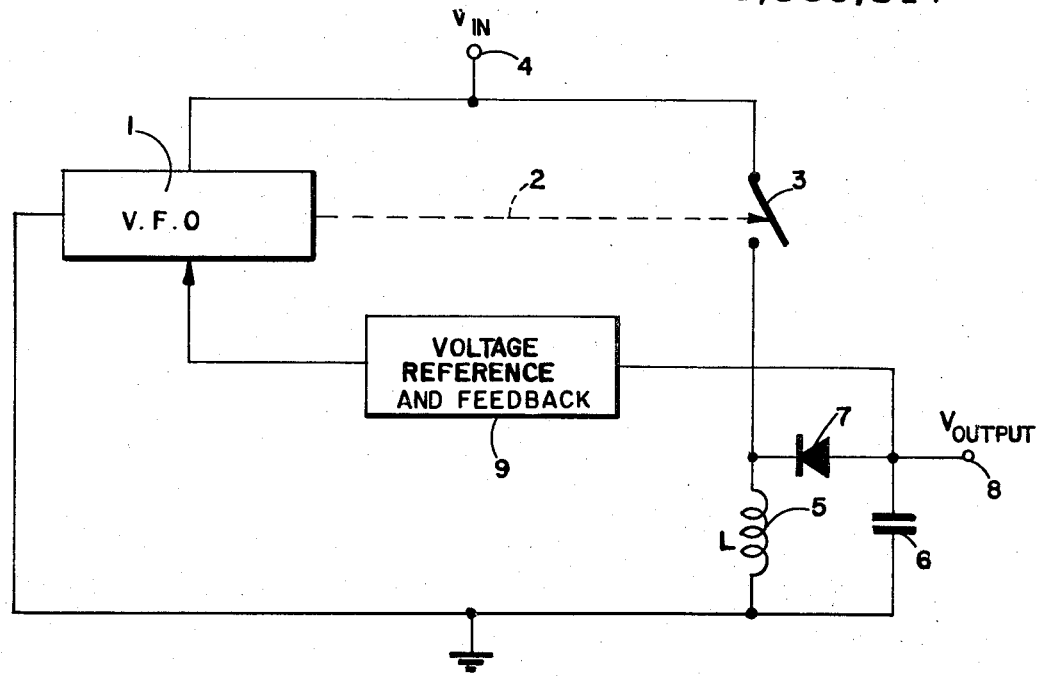
FIG. 1
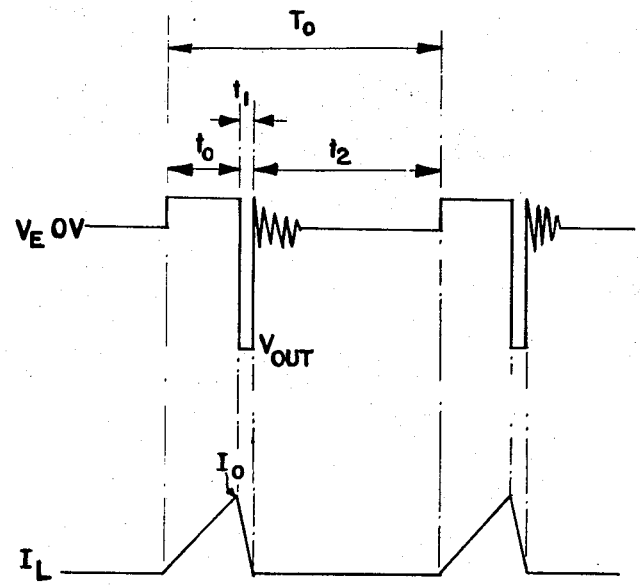
FIG. 3a
FIG. 3b

OSCILLATOR CONTROL POWER CONVERTER

BACKGROUND OF THE INVENTION

1. Field of the Invention

The invention relates to an oscillator controlled power converter and more particularly to such a power converter in which energy stored in an inductor and then transferred from the inductor to an output terminal provides a feedback voltage to regulate the D.C. output voltage.

2. Description of Prior Art

A D.C. to D.C. power converter which provides that the output voltage ($V_{out}$) be greater than or less than the input voltage ($V_{in}$) and that a relatively wide range of $V_{in}$ be regulated where the $V_{out}$ and $V_{in}$ are D. C. voltages, are usually complex in circuitry and have a relatively high cost.

For example, a D.C. to D.C. power converter may require an output power of 0.25 watts at −25.0V with an efficiency of 55 percent. The input voltage range may vary from 3.5 volts to 6.5 volts with a 1 percent regulation of the output voltage.

The present invention provides a power converter which satisfies the requirements of a complex converter with a substantially lower cost.

SUMMARY OF THE INVENTION

Briefly the invention comprises a power converter including an oscillator which provides an output signal which is variable as a function of changes in a D.C. input voltage and/or an output load. The converter output voltage is sensed and fedback to control the output of the oscillator.

The output signal from the oscillator provides a variable frequency signal which controls a switch in series with the D.C. input voltage and an inductive storage device. When the switch is on, energy from the input voltage is stored in the coil. When the switch is turned off, the stored energy is transferred to an output capacitor through a blocking diode to provide a D.C. output voltage. In the preferred embodiment, a zener diode may be connected between the capacitor output terminal and the oscillator for providing the required feedback and voltage reference. The amount of voltage feedback varies as a function of variations in the D.C. input voltage and/or the output load, thereby providing output voltage regulation for these variations.

Therefore it is an object of this invention to provide an improved oscillator controlled power converter.

It is another object of this invention to provide a power converter circuit which is relatively simple to implement and which can be implemented at a relatively low cost.

Another object of this invention is to provide a RC oscillator providing a variable frequency output signal for controlling a switch between a D.C. input voltage and a load across which is developed a D.C. output voltage.

Another object of this invention is to provide an RC oscillator circuit generating an output signal having a frequency which varies as a function of variations in an input voltage and a load whereby a switch controlled by the variable frequency signal can be used to regulate the amount of input power which is transferred to the output.

These and other objects of this invention will become more apparent when taken in connection with the description of the drawings, a brief description of which follows:

BRIEF DESCRIPTION OF THE DRAWINGS

FIG. 1 is a block diagram representation of the oscillator controlled power converter in accordance with the present invention.

FIGS. 3a and 3b are waveforms taken at various points in the FIG. 2 circuit.

DESCRIPTION OF THE PREFERRED EMBODIMENT

Figure 2:
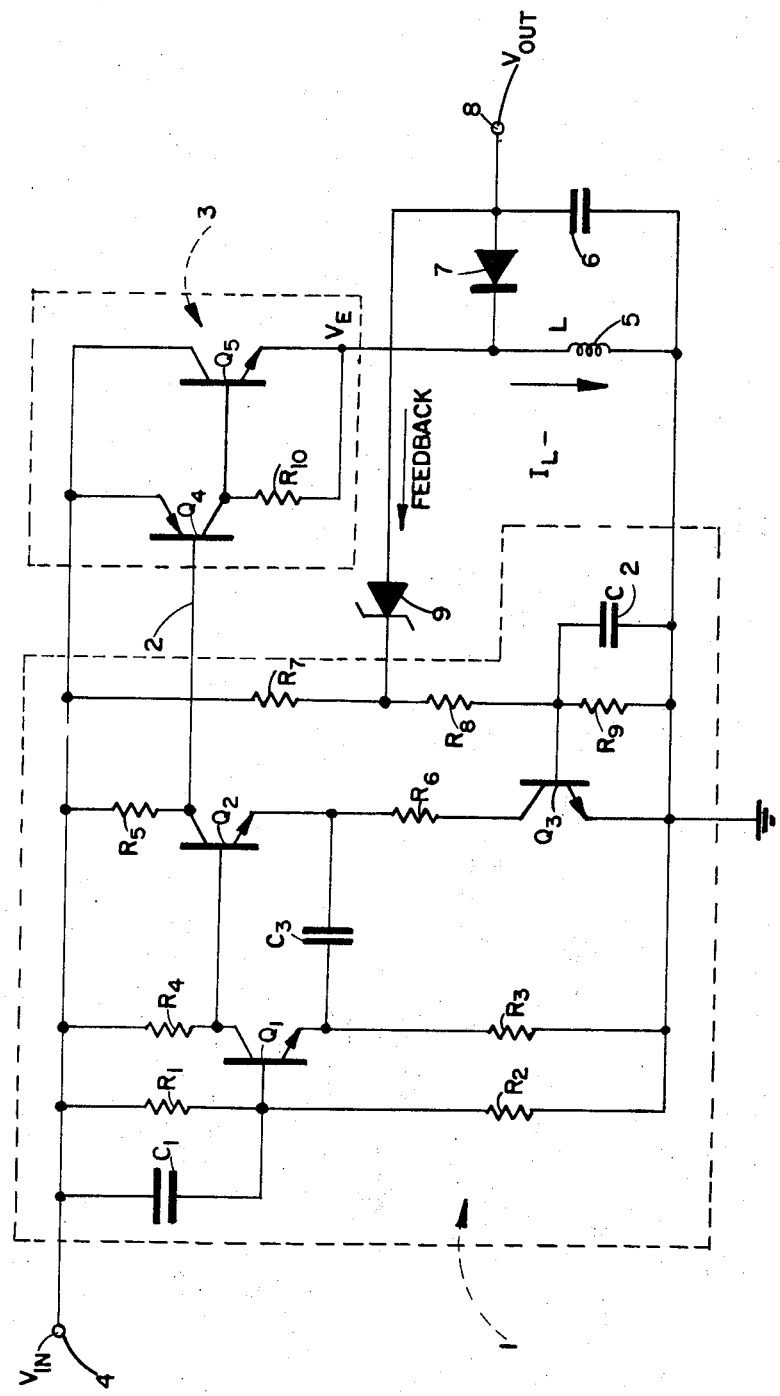
FIG. 2 is a schematic diagram of one embodiment of the FIG. 1 converter.

FIG. 1 illustrates variable frequency oscillator 1 which generates a control signal on line 2 for controlling switch 3. Switch 3 is connected between a D.C. input voltage at terminal 4 and a first terminal of an inductance coil 5, the second terminal of the coil being grounded. Connected to the first terminal of coil 5 is a diode 7 in series with an output capacitor 6, the capacitor being connected to the second terminal of the coil with the output voltage being taken at terminal 8 between the diode and capacitor. The output voltage at terminal 8 is fedback through the voltage reference circuit 9 to the variable frequency oscillator 1.

Switch 3 is controlled by a signal generated by oscillator 1. The frequency of the signal is dependent upon the output load and the input voltage. If either the load or the input voltage change, an error signal relative to the reference voltage level is generated by the voltage reference circuit 9. The error signal changes the frequency of the oscillator signal for changing the interval during which the switch 3 is open.

When the switch 3 is ON, energy from the input voltage at terminal 4 is stored across the inductor 5. When the switch 3 is open, the stored energy is transferred to the output load through diode 7. Diode 7 is rendered conductive as a result of the transformer action of inductor 5 when switch 3 is opened. It is pointed out that a transformer could be used in place of the inductor 5.

FIG. 2 is a schematic diagram of the variable frequency oscillator 1, switch 3, conductor 2, inductor 5, and capacitor 6. Diode 7 and the feedback loop consisting of the voltage reference circuit 9 are also shown. In the preferred embodiment, the voltage reference circuit is a zener diode. The output is taken at terminal 8.

Switch 3 comprises transistors Q4 and Q5. Transistor Q4 is a PNP transistor while transistor Q5 is an NPN transistor. Resistor $R_{10}$ is connected between the base and emitter electrodes of transistor Q5.

The variable frequency oscillator 1 comprises a voltage divider network including resistors $R_7$, $R_8$ and $R_9$. Capacitor $C_2$ is connected across resistor $R_9$ to filter high frequency signal components. The voltage feedback across zener diode 9 is divided down by the action of the voltage divider network to provide base current for NPN transistor Q3. The conduction through resistor $R_5$, NPN transistor Q2 and resistor $R_6$ is determined as a function of the control current on the base electrode of transistor Q3.

The base electrode of transistor Q2 is controlled by the conduction through NPN transistor Q1. NPN transistor Q1 is connected in series between resistors $R_4$ and $R_3$. The series combination is connected between the input voltage and electrical ground. Capacitor $C_3$ is connected between the emitter electrodes of transistors Q1 and Q2. $R_1$, $C_1$ are connected in parallel between the base electrode of transistor Q1 and the input voltage to provide a low impedance for oscillation. Resistor $R_2$ is connected between the base electrode and electrical ground for biasing the base electrode of Q1.

For a description of the operation, it is assumed that Q2 is switched ON so that transistor Q1 is switched OFF and transistors Q4 and Q5 are switched ON. In other words, when transistor Q2 conducts, a base current is provided to transistor Q4 to enable transistor Q4 to turn ON. When transistor Q4 is switched ON, a base current is provided for turning transistor Q5 ON.

As a result of switching transistor Q5 ON, current is enabled to flow from the input terminal 4 through coil 5. The current waveform is shown in FIG. 3b as I. The current signal is in the form of a ramp which increases until transistor Q2 is turned OFF for switching transistors Q4 and Q5 OFF.

Transistor Q2 switches OFF when transistor Q1 becomes conductive as a result of the charge across capacitor $C_3$. In other words, when transistor Q2 is switched ON, capacitor $C_3$ charges through resistor $R_3$ to the input voltage minus the drop across resistor $R_5$ and transistor Q2. When capacitor $C_3$ has been charged to a value which allows the emitter of Q1 to become .5V more negative than its base Q1 is switched ON and Q2 is switched OFF.

Since the $R_3$, $C_3$ charge interval determines the period during which Q2 is ON, it can be said that the ramp time, $t_o$, of $I_L$ is determined by $R_3$, $C_3$. The interval of $t_o$ is also shown in FIG. 3b. The input voltage minus the switch voltage drop is applied across the inductor 5 when transistor Q5 is switched ON and is maintained across the inductor for the $t_o$ interval. When Q5 is switched OFF, a voltage reversal occurs across inductor 5 in accordance with transformer action. The voltage reversal renders diode 7 conductive for transferring the energy in the inductor to capacitor 6. The energy transfer interval is represented by the $t_1$ time. Any energy which has been lost from the output during the intervening interval is thus replaced when switch 3 is turned OFF. As a result the output voltage remains relatively constant. The energy in the form of output voltage $V_{out}$ is fedback through the constant voltage zener diode 9 to the voltage divider network comprised of resistors $R_7$, $R_8$, $R_9$, and $C_2$. If the output voltage increases, zener diode 9 reduces transistor Q3's base drive current thus reducing Q3's collector current. As a result, a longer period of time is required for capacitor $C_3$ to discharge causing transistor Q2 to remain OFF for a longer period of time.

On the other hand, if the output voltage decreases zener diode 9 increases transistor Q3's base drive current thus increasing Q3's collector current. As a result, a shorter period of time is required for capacitor $C_3$ to discharge causing Q2 to remain off for a shorter period of time. Therefore, if the output voltage decreases, i.e. becomes more positive, Q2 turns ON sooner for closing switch 3 more. On the other hand, if the output voltage becomes more negative, Q2 remains OFF for a longer period of time and switch 3 is not switched ON as frequently. The interval during which Q2 is held OFF and therefore switch 3 is held open, is represented by time $t_1+t_2$, and is determined by the effective resistance of $R_3$ and Q3 and the capacitance of $C_3$. The cycle for the oscillator is represented by $T_o$ as shown in FIG. 3a.

The voltage waveform $V_E$ at the output of Q5 (across the inductor 5) is shown in FIG. 3a. During $t_o$, the voltage remains relatively constant as the inductor current, $I_L$ increases to $I_o$. During $t_1$ when Q5 is switched OFF, the polarity of the voltage, $V_E$, reverses thereby rendering diode 7 conductive to transfer energy from inductor 5 to output capacitor 6. After the energy has been transferred, the circuit oscillates slightly as shown in the FIG. 3a until the next cycle at the end of $t_2$.

It should be understood that although bipolar transistor devices are shown as implementing certain of the active elements of the oscillator, other electronic devices are also suitable. For example, field effect transistors may be used to replace the bipolar transistors. In addition, certain of the capacitors can be implemented by the formation of a metal plate over a semiconductor region separated by a relatively thin layer of a dielectric material such as silicon dioxide. Resistors can also be implemented by forming diffused regions in a semiconductor substrate. In addition, resistive material may be deposited on the substrate surface and then connected in a known manner to solid state devices formed within the substrate.

I claim:

1. An oscillator controlled power converter comprising an input terminal for connection to a D.C. input voltage;

an inductive storage device having first and second terminals, said second terminal connected to a reference voltage source;

an oscillator for generating a variable control signal;

a switch operated by said variable control signal, said switch connected between said input terminal and the first terminal of said inductive storage device, said D.C. input voltage source being connected to said inductive storage device for storing energy therein when said switch is closed in response to said variable control signal and being disconnected therefrom when said switch is opened in response to said variable control signal;

an output terminal;

blocking means connected between the first terminal of said inductive storage device and said output terminal for preventing energy transfer to said output terminal when said switch is closed for storing energy in said inductive storage device, the opening of said switch causing a polarity reversal of the voltage across said inductive storage device, and said blocking means responding to said polarity reversal to transfer energy from said inductive storage device to said output terminal for providing an output voltage thereat; and feedback means including voltage reference means connected between said output terminal and said oscillator for comparing said output voltage with a reference voltage level and for feeding back differences between said output voltage and said reference voltage level, the fed back voltage controlling the operation of said oscillator to vary said control signal whereby the opening and closing intervals of said switch are varied to maintain a relatively constant output voltage.

2. The power converter recited in claim 1 wherein said oscillator is an emitter-coupled, R-C oscillator including first and second transistors, the collector of said first transistor connected to the base of said second transistor;

biasing means for rendering said transistors alternately conductive for deriving said control signal as a variable frequency signal at the collector of said second transistor, said biasing means including a capacitor connecting the emitters of said transistors, first resistance means in the emitter circuit of said first transistor, second resistance means in the emitter circuit of said second transistor, whereby when said second transistor is rendered conductive a charge path is provided for said capacitor through said first resistance means to charge said capacitor to a level sufficient to render said first transistor conductive to turn off said second transistor thereby providing a discharge path for said capacitor through said second resistance means;

the conductive interval of said second trnsistor being determined by the resistance of said first resistance means and the capacitance of said capacitor, and the nonconductive interval thereof being determined by the effective resistance of said second resistance means and the capacitance of said capacitor;

said second resistance means including a control transistor operative to control current flow through said second resistance means to vary the effective resistance thereof, thereby controlling duration of the nonconductive interval of said second transistor and the frequency of said variable frequency signal;

said control transistor having its base electrode connected to said feedback means to receive said fed back voltage, whereby said feedback voltage establishes the base drive of said control transistor, and thereby the frequency of said variable frequency signal for maintaining said output voltage relatively constant.

3. THe power converter recited in claim 1 including an output capacitor connected between said output terminal and said second terminal of said inductive storage device, and wherein said inductive storage device is a single winding coil, said blocking means is a diode, said feedback means is a zener diode, and said switch is a transistor switch.

4. The power converter in claim 2 and including, potential divider means for establishing the base drive for said control transistor, said feedback means comprising a zener diode connected between said output terminal and said potential divider means, whereby conduction through said zener diode varies the base drive of said control transistor.

5. The power converter as in claim 4 including an output capacitor connected between said output terminal and said second terminal of said inductive storage device.

6. The power converter as in claim 4 wherein said inductive storage device is a single winding coil.

* * * * *

PO-1050
(5/69)

UNITED STATES PATENT OFFICE
CERTIFICATE OF CORRECTION

Patent No. 3,803,517          Dated April 9, 1974

Inventor(s) Bellocchio, Leon F.

It is certified that error appears in the above-identified patent and that said Letters Patent are hereby corrected as shown below:

In the Abstract, line 69, after "output", insert --load--.

Column 1, line 42, delete "capacitor".

Column 3, line 34, after input, change "voltage minus" to

--voltage (minus--.

line 35, change "drop" to --drop)--.

line 62, after "more", insert --frequently--.

Column 4, line 31, change "age;" to --age source;--.

Column 6, line 5, change "feedback" to --fed back--.

Signed and sealed this 10th day of September 1974.

(SEAL)
Attest:

McCOY M. GIBSON, JR.
Attesting Officer

C. MARSHALL DANN
Commissioner of Patents